United States Patent Office 3,484,688
Patented Dec. 16, 1969

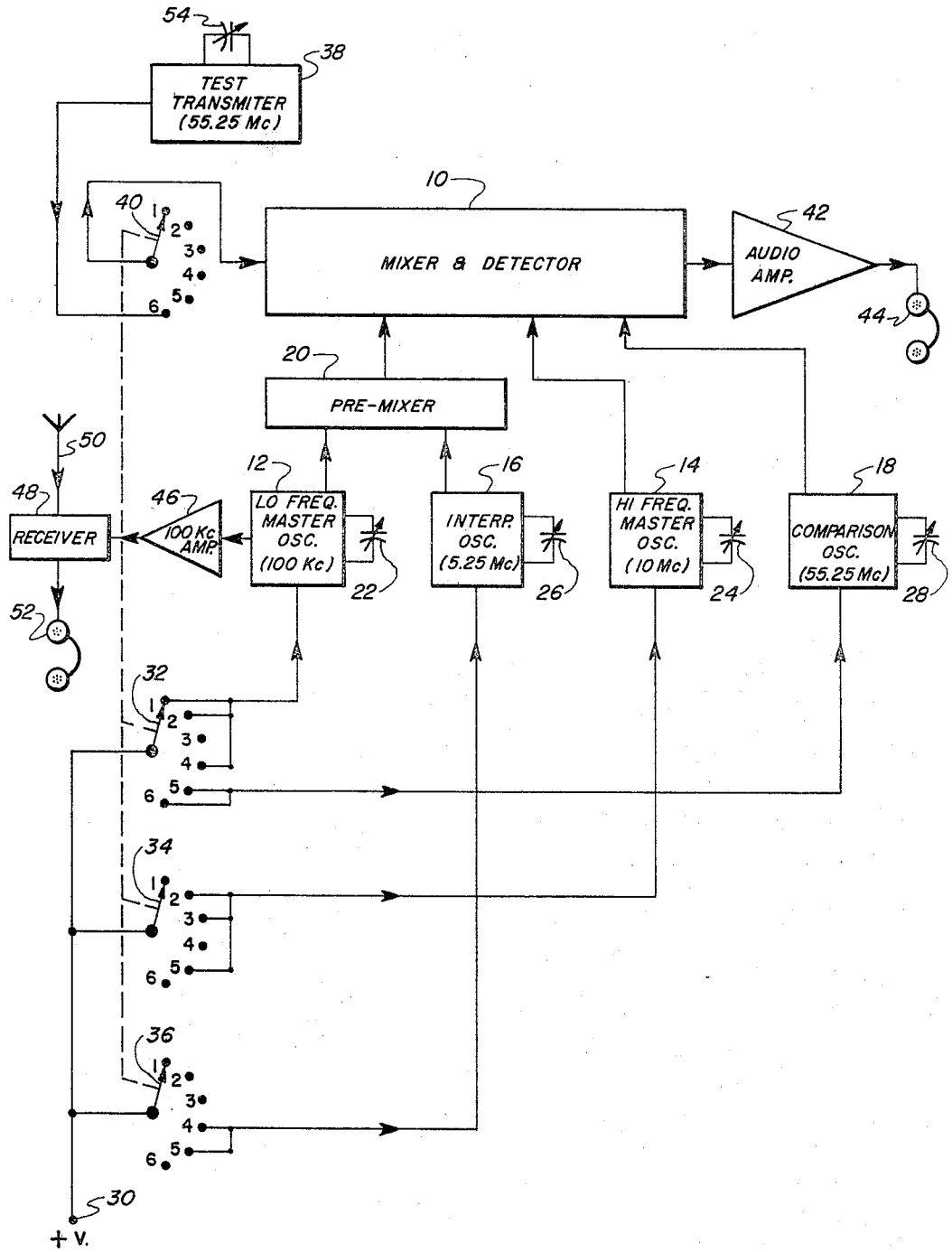

3,484,688
FREQUENCY TESTING APPARATUS AND METHOD PROVIDING A SINGLE FREQUENCY COMPARISON SIGNAL
James H. Platz, P.O. Box 1042,
Pendleton, Oreg. 97801
Filed Apr. 13, 1966, Ser. No. 542,245
Int. Cl. G01r 23/14
U.S. Cl. 324—79
12 Claims

ABSTRACT OF THE DISCLOSURE

A frequency testing apparatus and method are described in which a comparison signal of a single predetermined frequency is generated and used for determining whether the output signal of a radio wave transmitter or other signal generator is of a predetermined frequency. The comparison signal alone is compared with the output signal of the signal generator under test to provide frequency measurements of high accuracy without ambiguity. As a result the color burst oscillator of a color television transmitter can be tuned to within one-half cycle of its desired frequency of 3,579,545 c.p.s.

---

The subject matter of the present invention relates generally to frequency testing of electrical signal generator to determine whether the output signal of the signal generator is of a predetermined frequency, and in particular to a frequency testing apparatus and method for radio wave transmitters which creates a comparison signal of a single predetermined frequency and mixes such comparison alone with the output signal of the transmitter under test to determine whether such output signal is of a proper frequency and to enable such transmitter to be tuned to the proper frequency.

The present frequency testing apparatus is especially useful for testing the television transmitters of commercial broadcast stations, but may also be employed to test other radio wave transmitters including commercial F.M. or A.M. transmitters and any other periodic signal generator.

The frequency testing apparatus of the present invention has several advantages over conventional apparatus employed for this purpose. Conventional heterodyne type frequency measuring apparatus employs a single master oscillator and a plurality of frequency divider circuits and/or frequency multiplier circuits in order to produce a plurality of standard signals of different predetermined frequency which are mixed together and simultaneously compared with the signal under test to determine whether such test signal is of the proper frequency. This has the disadvantage that several harmonics are produced by mixing several standard signals of different frequency so that the zero beat indications on a meter or earphone are frequently ambiguous since it is difficult to determine whether the test signal is beating with the desired frequency or with some harmonic thereof. In addition, such conventional frequency measuring apparatus are not as accurate as the apparatus of the present invention, since there are inaccuracies due to the fact that the signals produced by the tuned resonant circuits used in frequency dividers and frequency multipliers are always of more than one frequency. One such frequency measuring apparatus employing a single master oscillator and a frequency divider circuit is shown in U.S. Patent 2,967,931 issued Jan. 10, 1961 to D. R. Willis. This prior apparatus also employs a pair of calibrated measuring oscillators which are expensive and difficult to maintain in calibration so that their dial readings are accurate.

Briefly, one embodiment of the frequency testing apparatus of the present invention employs four separate oscillators including a high frequency master oscillator, a low frequency master oscillator, an interpolation oscillator and comparison oscillator whose output signals are selectively applied to a mixer and detector circuit. One of the master oscillators is tuned to an exact predetermined frequency by comparing it with a standard signal broadcast from the National Bureau of Standards or some other local source. When the low frequency master oscillator is set to a standard frequency of 100 kilocycles per second (kc. s.), the high frequency master oscillator is tuned to a multiple of the low frequency master signal which may be 10 megacycles per second (mc.s.). Next, interpolation oscillator is tuned to an interpolation frequency related to a harmonic of the 100 kc. s. low frequency master signal which, when such interpolation signal is added to the harmonic of the 10 mc.s. high frequency master signal, provides a combined signal having a frequency equal to the desired frequency of the transmitter under test. Then the comparison signal output of the comparison oscillator is mixed with this combined signal to enable the comparison signal to be tuned to such desired frequency. Finally, the comparison signal alone is mixed with the output signal of the transmitter under test to enable such test transmitter to be tuned to the desired frequency, which is indicated without any ambiguity by a zero beat frequency produced by an audio amplifier and earphones connected to the output of the mixer circuit.

It is therefore one object of the present invention to provide an improved frequency testing apparatus of simple, compact and economical construction.

Another object of the present invention is to provide an improved frequency testing apparatus and method which provide a comparison signal of a single predetermined frequency to determine with great accuracy and without ambiguity when the signal generator under test is tuned to the desired frequency.

A further object of the present invention is to provide a frequency testing apparatus of the heterodyne type which may be operated to provide a frequency measurement of high resolution with great accuracy in a simple and relatively fast manner.

An additional object of the present invention is to provide an improved frequency measuring apparatus which employs four separate oscillators for generating the signals used to create a final comparison signal of the desired frequency, such oscillators being selectively switched to a power supply to energize the oscillators so that the apparatus is operated in an efficient manner which enables very low power consumption.

Other objects and advantages will be apparent from the following detailed description of a preferred embodiment of the present invention shown in the attached drawings of which:

The sole figure of the drawing shows a block diagram of the preferred embodiment of the frequency testing apparatus of the present invention.

As shown in the drawing, the frequency testing apparatus of the present invention includes a signal mixer and detector circuit 10 connected to the outputs of four oscillators including a low frequency master oscillator 12, a high frequency master oscillator 14, an interpolation oscillator 16, and a comparison oscillator 18. A premixer stage 20 is connected between the main mixer 10 and the outputs of the low frequency master oscillator and the interpolation oscillator. Each of the oscillators 12, 14, 16 and 18 is a crystal controlled oscillator which may be turned over a narrow frequency range of a few hundred c./s., as indicated schematically by the variable capacitors 22, 24, 26, 28, respectively connected to such oscillators, and such frequency range may be changed by selecting a different crystal within the oscillator. The four oscillators 12, 14, 16 and 18 are selectively energized by a D.C. power supply connected to terminal 30, by means of three rotary selector switches 32, 34, 36, having their movable contacts ganged together and electrically connected to such power supply. As a result of this efficient operation very little powre is required to operate the present frequency testing apparatus so that a 9 volt battery may be employed as the power supply of a transistorized embodiment with an average D.C. current of only about 30 milliamperes to enable such apparatus to be portable and completely self-contained.

Each of the three selector switches 32, 34 and 36 is a six-position switch whose fixed contacts are connected to one of the oscillators 12, 14, 16 and 18 as hereafter described. Thus, in the first switch position the low frequency master oscillator 12 is energized. In the second switch position both the high and low frequency master oscillators are energized. The high frequency master oscillator alone is energized in the third switch position, while in the fourth switch position the low frequency master oscillator and the interpolation oscillator are energized. In the fifth switch position the comparison oscillator, the high frequency master oscillator, and the interpolation oscillator are energized. Finally, in the sixth switch position only the comparison oscillator is energized. In addition a transmitter 38 under test is connected to the mixer and detector circuit 10 at the same time as the comparison oscillator, by another selector switch 40. Selector switch 40 is a six-position rotary switch whose movable contact is ganged to those of switches 32, 34 and 36 and is electrically connected to the transmitter 38 only in the sixth position of such switch. Of course a two-position on-off switch may be provided in place of selector switch 40 if so desired.

The output of the mixer and detector circuit 10 is transmitted through an audio amplifier 42 to a beat frequency indicator device which may be in the form of earphones 44, a loudspeaker or a beat frequency counter and meter (not shown). In addition, the high frequency master oscillator 14 can be replaced by a frequency multiplier circuit connected to the low frequency master oscillator 12, or the low frequency master oscillator can be replaced by a frequency divider circuit connected to the high frequency master oscillator. However, for greater accuracy it is preferred that the high frequency master signal and the low frequency master signal be provided by separate oscillators.

Either the low frequency master oscillator 12 or the high frequency master oscillator 14 may be tuned to a standard frequency broadcast by the National Bureau of Standards or other locally produced standard frequency of sufficiently high accuracy. However in the embodiment shown in the drawing the low frequency master oscillator is connected through an amplifier 46 to a receiver 48 whose antenna 50 picks up the standard frequency broadcast signal which may have a frequency of 100 kc. s. or a multiple thereof. The low frequency master oscillator is then tuned to a frequency of 100 kc. s. by adjustment of tuning capacitor 22 until a zero beat frequency output signal is heard by earphones 52 connected to the output of such receiver.

The operation of the frequency measuring apparatus of the present invention is as follows. With the selector switches 32, 34, 36 and 40 in the first position, or the third position, the low frequency master oscillator 12 or the high frequency master oscillator 14 as the case may be is tuned to a standard frequency broadcast signal. In the example shown, the low frequency master oscillator is tuned to the standard frequency broadcast signal of 100 kc. s. or a multiple thereof by means of receiver 48 as indicated above. Then the selector switches are moved to the second position, and in the case illustrated in the drawing, the high frequency master oscillator is tuned to a multiple of the low frequency master oscillator to provide a high frequency master signal of 10 mc. s. Next the selector switches are moved to the fourth position and the interpolation oscillator 16 is tuned to a harmonic of the 100 kc. s. low frequency master signal which corresponds to the frequency difference between the test transmitter frequency and the closest multiple of the 10 mc. s. high frequency master signal. For example, assuming that the desired frequency of the test transmitter 38 is 55.25 mc. s. which is the video carrier frequency for VHF television channel 2, the interpolation oscillator is tuned to 5.25 mc. s. because 55.25 mc.s.—5×10 mc. s.=5.25 mc. s.

This is accomplished by tuning interpolation oscillator until the 10.5 mc. s. second harmonic of its 5.25 mc. s. output signal zero beats with the 10.5 mc. s. 105th harmonic of the low frequency master oscillator signal of 100 kc. s.

Next the selector switches are moved to the fifth position and the output signal of the comparison oscillator 18 is varied in frequency until it corresponds to the sum of the 50 mc. s. fifth harmonic of the high frequency master signal and the 5.25 mc. s. output signal of the interpolation oscillator so that such comparison signal is set at 55.25 mc. s. or a submultiple thereof. Finally, in the sixth position of the selector switch only the output signals of the comparison oscillator 18 and the test transmitter 38 are applied to the mixer and detector circuit 10 and the test transmitter is tuned by adjustment of its variable capacitor 54 or other tuning element until a zero frequency beat is heard by earphones 52 which indicates when the transmitter signal has a frequency of exactly 55.25 megacycles.

It should be noted that different frequency ranges can be covered with oscillators 12, 14, 16 and 18 merely by switching between a plurality of different crystals covering such ranges, even though this is not shown in the drawing for purposes of simplicity. Thus, while the above example is given for measuring the frequency of the video carrier or a television signal, the present apparatus can also be used to measure the audio carrier of a television signal and radio broadcast signals of F.M. or A.M. radio transmitters, as well as other signal generators. Furthermore the present apparatus is capable of high resolution as shown by the fact it can set the color burst oscillator of a television signal transmitter at the exact frequency of 3,579,545 c./s. to an accuracy of one half cycle in the following manner. Thus the interpolation oscillator can be tuned to 8.75 megacycles by causing its 16.5 mc. s. second harmonic to zero beat with the 165th harmonic of the low frequency master signal of 100 kilocycles. Then the comparison oscillator 18 is tuned to zero beat at 78.75 megacycles by mixing the comparison signal with the sum of the interpolation signal of 8.75 megacycles and the 70 mc. s. seventh harmonic of the high frequency master signal. The 22nd subharmonic of the 78.75 mc. s. comparison signal is 3,579,545 and 10/22 cycles per second. Thus by using the apparatus of the present invention the color burst signal transmitter can be tuned to within less than one half cycle of the desired frequency. From the above it is clear that the present frequency measuring apparatus has sufficient resolution and accuracy to easily satisfy the Federal Communications Commission requirement that the color burst frequency be maintained within ten cycles of the standard frequency.

It will be obvious to those having ordinary skill in the art that many changes may be made in the details of the above-described preferred embodiment of the present invention without departing from the spirit of the invention. For example, while a source of positive D.C. supply voltage has been shown connected to terminal 30, such voltage may be negative if the transistors in oscillators 22, 24, 26 and 28 are changed from PNP to NPN types. Also the oscillators need not be crystal controlled but can be conventional self-excited oscillators which are tunable over a wider frequency range if less accuracy is acceptable.

I claim:

1. Frequency testing apparatus for determining whether the output signal of a signal generator is of a predetermined frequency by comparing said output signal with a single comparison signal adjusted to said predetermined frequency, comprising:

first means for producing a low frequency master signal of adjustable frequency;

second means for producing a high frequency master signal of adjustable frequency;

an interpolation oscillator of adjustable frequency;

tuning means for comparing one of the two master signals with a frequency standard and for tuning said one master signal to a frequency related to the standard frequency;

a comparison oscillator means of adjustable frequency for producing a comparison signal of a single frequency corresponding to said predetermined frequency;

a common signal mixer circuit;

indicator means connected to the output of the mixer circuit for indicating the beat frequency of signals applied to inputs of said mixer circuit;

control means including a switch for selectively applying to the inputs of the mixer circuit in the order named, first, the two master signals to enable the other master signal to be tuned to a multiple or submultiple of the frequency of said one master signal; second, the output signals of the tuned low frequency master oscillator and the interpolation oscillators to be tuned to an interpolation frequency corresponding to the difference in frequency between said predetermined frequency and a multiple of the high frequency master signal; third, the output signals of the tuned high frequency master oscillator, the tuned interpolation oscillator and the comparison oscillator to enable the comparison signal to be tuned to a comparison frequency corresponding to said predetermined frequency; and fourth, the output signal of the signal generator under test and the comparison signal to mix said output signal solely with said comparison signal in order to determine whether said signal generator is tuned to said predetermined frequency by comparing its output signal only with the single comparison frequency of said comparison signal.

2. Frequency testing apparatus in accordance with claim 1 in which said first means and said second means are two separate master oscillators.

3. Frequency testing apparatus in accordance with claim 2 in which the tuned frequencies of said master oscillators are decade frequencies and the high frequency master signal is at least one hundred times the frequency of the low frequency master signal.

4. Frequency testing apparatus in accordance with claim 2 in which the switch selectively connects the oscillators to a source of D.C. supply voltage to energize said oscillators and cause them to transmit output signals to the mixer circuit.

5. Frequency testing apparatus in accordance with claim 1 in which the mixer circuit includes a detector means for providing an audio frequency signal at the output of said mixer and the indicator means includes an audio frequency amplifier and an audio signal indicator.

6. Frequency testing apparatus in accordance with claim 2 in which the mixer circuit includes a main mixer directly connected to the outputs of the high frequency master oscillator and the comparison oscillator, and also includes a preliminary mixer connected between said main mixer and the outputs of the low frequency oscillator and the interpolation oscillator.

7. Frequency testing apparatus in accordance with claim 2 in which the tuning means includes a broadcast signal receiver which is tuned to a broadcast signal of constant standard frequency and is connected through an amplifier to the output of the one master oscillator which is tuned to said standard frequency.

8. Frequency testing apparatus in accordance with claim 2 in which the low frequency master signal is 100 kilocycles per second and the high frequency master signal is 10 megacycles per second.

9. The frequency testing apparatus of claim 1 in combination with a television signal transmitter connected to said apparatus as the signal generator under test.

10. A method for testing the frequency of the output signal of a signal generator to determine whether it is of a predetermined frequency comprising the steps of:

mixing a first master signal with the signal of a frequency standard and tuning said first master signal to a frequency related to that of said standard;

mixing a second master signal with said first master signal and tuning the second master signal to a frequency multiple of said first master signal;

mixing an interpolation signal with the master signal of lowest frequency and tuning said interpolation signal to a frequency corresponding to the difference in frequency between said predetermined frequency and a multiple of the master signal of highest frequency;

mixing a comparison signal with the tuned master signal of highest frequency and the tuned interpolation signal and tuning said comparison signal to a single comparison frequency corresponding to said predetermined frequency; and mixing the output signal of the signal generator under test solely with said comparison signal to compare the frequency of said output signal only with said single comparison frequency.

11. A method in accordance with claim 10 in which the first master signal is the lowest frequency master signal and the second master signal is the highest frequency master signal.

12. A method in accordance with claim 10 in which the first master signal, the second master signal, the interpolation signal, and the comparison signal are all generated by different oscillators.

References Cited

UNITED STATES PATENTS

| 2,763,836 | 9/1956 | Bullock | 324—79 |
| 3,102,980 | 9/1963 | Houck et al. | 324—79 |

RUDOLPH V. ROLINEC, Primary Examiner

P. F. WILLE, Assistant Examiner

U.S. Cl. X.R.

328—133

PO-1050
(5/69)

UNITED STATES PATENT OFFICE
CERTIFICATE OF CORRECTION

Patent No. 3,484,688        Dated December 16, 1969

Inventor(s) JAMES H. FLATZ

It is certified that error appears in the above-identified patent and that said Letters Patent are hereby corrected as shown below:

Column 1, line 33, before "alone" insert --signal--; column 2, line 69, "turned" should be --tuned--; column 3, line 8, "powre" should be --power--; column 5, line 31, "interpolation oscillators" should be --interpolation oscillator to enable said interpolation oscillator--.

SIGNED AND
SEALED
MAY 5 1970

(SEAL)
Attest:

Edward M. Fletcher, Jr.
Attesting Officer

WILLIAM E. SCHUYLER, JR.
Commissioner of Patents